United States Patent
Zaslavsky et al.

(10) Patent No.: US 9,081,597 B2
(45) Date of Patent: Jul. 14, 2015

(54) DATABASE CHANGE COMPENSATION AFTER A TRANSACTION COMMIT

(71) Applicant: Red Hat Israel, Ltd., Raanana (IL)

(72) Inventors: Yair Zaslavsky, Netanya (IL); Mike Kolesnik, Ramat-Gan (IL)

(73) Assignee: Red Hat Israel, Ltd., Raanana (IL)

(*) Notice: Subject to any disclaimer, the term of this patent is extended or adjusted under 35 U.S.C. 154(b) by 170 days.

(21) Appl. No.: 13/686,093

(22) Filed: Nov. 27, 2012

(65) Prior Publication Data
US 2014/0149793 A1    May 29, 2014

(51) Int. Cl.
| | |
|---|---|
| *G06F 11/00* | (2006.01) |
| *G06F 9/455* | (2006.01) |
| *G06F 11/14* | (2006.01) |
| *G06F 17/30* | (2006.01) |

(52) U.S. Cl.
CPC ........ *G06F 9/45533* (2013.01); *G06F 9/45558* (2013.01); *G06F 11/142* (2013.01); *G06F 17/30371* (2013.01); *G06F 2009/45587* (2013.01)

(58) Field of Classification Search
CPC ............ G06F 11/1471; G06F 11/1474; G06F 11/1435; G06F 9/466; G06F 9/467
USPC ................................................. 714/19; 718/1
See application file for complete search history.

(56) References Cited

U.S. PATENT DOCUMENTS

| | | | |
|---|---|---|---|
| 2010/0153776 A1* | 6/2010 | Vick et al. ........................ 714/15 |
| 2012/0226947 A1* | 9/2012 | Alberi et al. ................. 714/38.1 |
| 2012/0324449 A1* | 12/2012 | Huetter et al. .................... 718/1 |
| 2013/0097398 A1* | 4/2013 | Waldspurger et al. ........ 711/162 |

* cited by examiner

*Primary Examiner* — Yair Leibovich
(74) *Attorney, Agent, or Firm* — Lowenstein Sandler LLP

(57) ABSTRACT

A virtualization manager receives a request to perform a command in a virtual machine system and executes a plurality of transactions associated with the command, each of the plurality of transactions comprising one or more operations executed on entities in the virtual machine system. The virtualization manager commits changes made to the entities in the virtual machine system as a result of the plurality of transactions to a management database for the virtual machine system. In addition, the virtualization manager generates a business entity snapshot corresponding to a first transaction of the plurality of transactions, the business entity snapshot comprising state information for one or more entities in the virtual machine system affected by the first transaction.

21 Claims, 6 Drawing Sheets

US 9,081,597 B2

DATABASE CHANGE COMPENSATION AFTER A TRANSACTION COMMIT

TECHNICAL FIELD

This disclosure relates to the field of virtualization and, in particular, to database change compensation after a transaction commit.

BACKGROUND

Virtualization allows multiplexing of the underlying host machine between different virtual machines. The host computer allocates a certain amount of its resources to each of the virtual machines. Each virtual machine is then able to use the allocated resources to execute applications, including operating systems (referred to as guest operating systems). The software layer providing the virtualization is commonly referred to as a hypervisor and is also known as a virtual machine monitor (VMM), a kernel-based hypervisor or a host operating system. The hypervisor emulates the underlying hardware of the host computer, making the use of the virtual machine transparent to the guest operating system and the user of the virtual machine.

Generally, information about the configuration and state of the entities in a virtual machine system, such as virtual machines, virtual disks, host machines, storage domains, etc., is stored in a system database. When a request is received to execute a command, management software executes a transaction to perform the operations needed to carry out the command. As the operations in the transaction affect entities in the virtual machine system, the changes that are made to those entities are typically committed to the system database. In some cases, the transactions required to carry out a command can be lengthy and resource intensive. Certain systems have attempted to solve this problem by shortening the transaction length. By breaking up a command into multiple shorter transactions, any one particular resource is not "locked" or otherwise made unavailable for any significant period of time. In this case, however, the changes caused by each transactions are committed to the system database at the end of each transaction. Once the changes are committed to the system database, there is generally no way to roll back those changes to revert to the previous state. Thus, if there is an crash or failure during the execution of the transaction, the system may not be able to recover and restore the values in the system database to the state before the command was initiated.

BRIEF DESCRIPTION OF THE DRAWINGS

The present disclosure is illustrated by way of example, and not by way of limitation, in the figures of the accompanying drawings.

DETAILED DESCRIPTION

Figure 1:
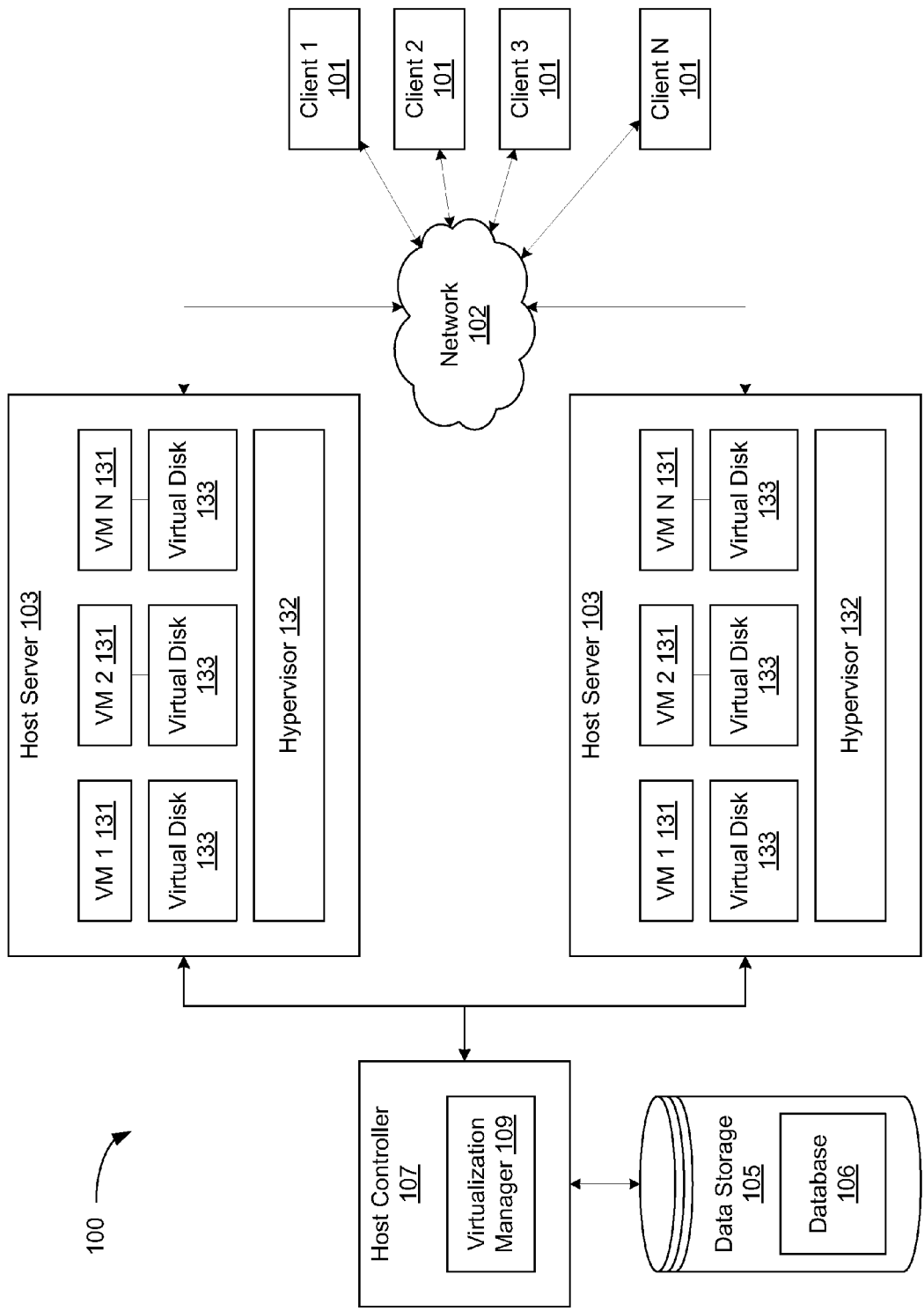
FIG. 1 is a block diagram illustrating an exemplary network architecture in which embodiments of the present invention may operate.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Described herein is a method and system for database change compensation after a transaction commit during the handling of a set of short transactions that logically represent a single longer transaction. In one embodiment, a virtualization manager controls operations of various entities (e.g., host servers, virtual machines, virtual disks) in a virtual machine system. A user or application may issue a command (e.g., through a networked client device) to perform some action on one or more entities in the system. The virtualization manager may identify and execute a series of transactions in order to carry out the action specified by the command. A transaction is a unit of work performed within a database management system against a database that is treated in a coherent and reliable way, independent from other transactions. For example, the command may be a request to start a new virtual machine, stop a virtual machine, create a virtual disk, or some other request. Multiple transactions associated with the command may include, for example, locking the target virtual machine so that no other operations on that virtual machine may be performed until the virtual machine is unlocked, adding a new virtual disk to the virtual machine, pre-allocating the virtual disk, and unlocking the virtual machine.

Upon executing a transaction associated with the command, the virtualization manager may create a business entity snapshot in a management database. The snapshot may include information about the transaction being executed by the virtualization manager. For example, the snapshot may include an indication of the command with which it is associated, an indication of the entity on which an action is performed, an indication of what action was performed, an indication of a change in state of the entity as a result of the action, and/or other information. Thus, the snapshot includes a table or other data structure, including one or more entries, each corresponding to a different parameter. The values of these parameters can be used to describe the state of the virtualization system (or at least the state of certain entities within the system) at a certain point in time, either before or after the transaction is executed. In one embodiment, the business entity snapshot is not a copy or image of the database or system, but rather an aggregation of data representing the state of the system at a certain point in time. This information in the snapshots may be maintained in the database until all of the transactions associated with the command have been successfully completed.

In one embodiment, once each transaction is completed, the state of the affected entities may be committed to an entity table of the management database. For example, if a virtual machine is initially unlocked, and then subsequently locked during execution of a transaction, the state of the virtual machine in the entity table may be overwritten as "locked." In the event of a crash, failure or other error in one of the transactions, there may not be a way to determine from the entity table itself what the previous state of that virtual machine was. Since the snapshot contains the initial state of any affected entities, the information in the snapshots may be used to roll back the virtual machine system to the state that existed before the command was initiated, thereby compensating for the changes after the transactions have been committed.

The use of the compensation (i.e., the ability to roll back the state of the system) and snapshot techniques described herein allows the virtual machine system to use a series of shorter transactions to carry out a command, while still maintaining the ability to roll back to the prior state in the event of a crash or other failure. Using shorter transactions may be beneficial because certain system resources are not tied up for lengthy periods of time. In addition, the risk of transactions timing out and being dropped are reduced. This may also be beneficial in read-committed systems, because a user will be able to monitor the progress of a command and get intermediate state information, rather than having to wait until all operations associated with the command are completed.

FIG. 1 illustrates an exemplary network architecture 100 in which embodiments of the present invention may operate. The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via a network or directly). Host controller 107 may be an independent machine such as a server computer, a desktop computer, etc. Alternatively, the host controller 107 may be part of a host server 103.

In one embodiment, the clients 101 may include computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may include server computers or any other computing devices capable of running one or more virtual machines 131. Each virtual machine 131 runs a guest operating system (OS) that may be different from one virtual machine to another. The guest OS may include Microsoft Windows, Linux, Solaris, Mac OS, etc. The host server 103 may include a hypervisor 132 that emulates the underlying hardware platform for the virtual machines 131. The hypervisor 132 may also be known as a virtual machine monitor (VMM), a kernel-based hypervisor or a host operating system.

Each virtual machine 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each virtual machine 131 may be linked to one or more virtual disks 133. These virtual disks 133 can be logical partitions of a physical disk managed by hypervisor 132, can be cloud based storage devices, or can be some other type of virtual storage device. In one embodiment, virtual disks 133 may form a whole or part of a logical data center. In one embodiment, virtual machines 131 and virtual disks 133, together with host servers 103, may be collectively referred to as entities in a virtual machine system.

The virtual machines 131 and virtual disks 133 are managed by the host controller 107. Host controller 107 may manage the allocation of resources from host server 103 to virtual machines 131. In addition, host controller may monitor the state of virtual machines 131 as well as the progress of commands and processes being executed by virtual machines 131 and/or on virtual machines 131. In one embodiment, a command may be issued by a user or application (e.g., through one of clients 101) to perform some action. The command may be received by a virtualization manager 109 running on host controller 107, which identifies and executes a series of transactions in order to carry out the action specified by the command. For example, the command may be a request to start a new virtual machine 131, stop a virtual machine 131, create a virtual disk 133, or some other request.

In one embodiment, virtualization manager 109 controls operations of all entities in the virtual machine system. As illustrated, virtualization manager 109 may run on host controller 107. In other embodiments, however, virtualization manager 109 may run on some other device, such as one of host servers 103 or on a virtual machine 131. Upon executing a transaction associated with the command, virtualization manager 109 may create a snapshot in a database 106 residing on a data storage device 105. The data storage device 105 may share the machine with the host controller 107 (e.g., a disk drive in the host controller computer) or be an independent device coupled to the host controller directly or via a network (e.g., as a network-attached storage device (NAS)). The snapshot may include information about the transaction executed by virtualization manager 109. For example, the snapshot may include an indication of the command with which it is associated, an indication of the entity on which an action is performed, an indication of what action was performed, an indication of a change in state of the entity as a result of the action, and/or other information. This information in the snapshots may be maintained in database 106 until all of the transactions associated with the command have been successfully completed. In the event of a crash, failure or other error in one of the transactions, the information in the snapshots may be used to roll back the virtual machine system to the state that existed before the command was initiated.

Figure 2:
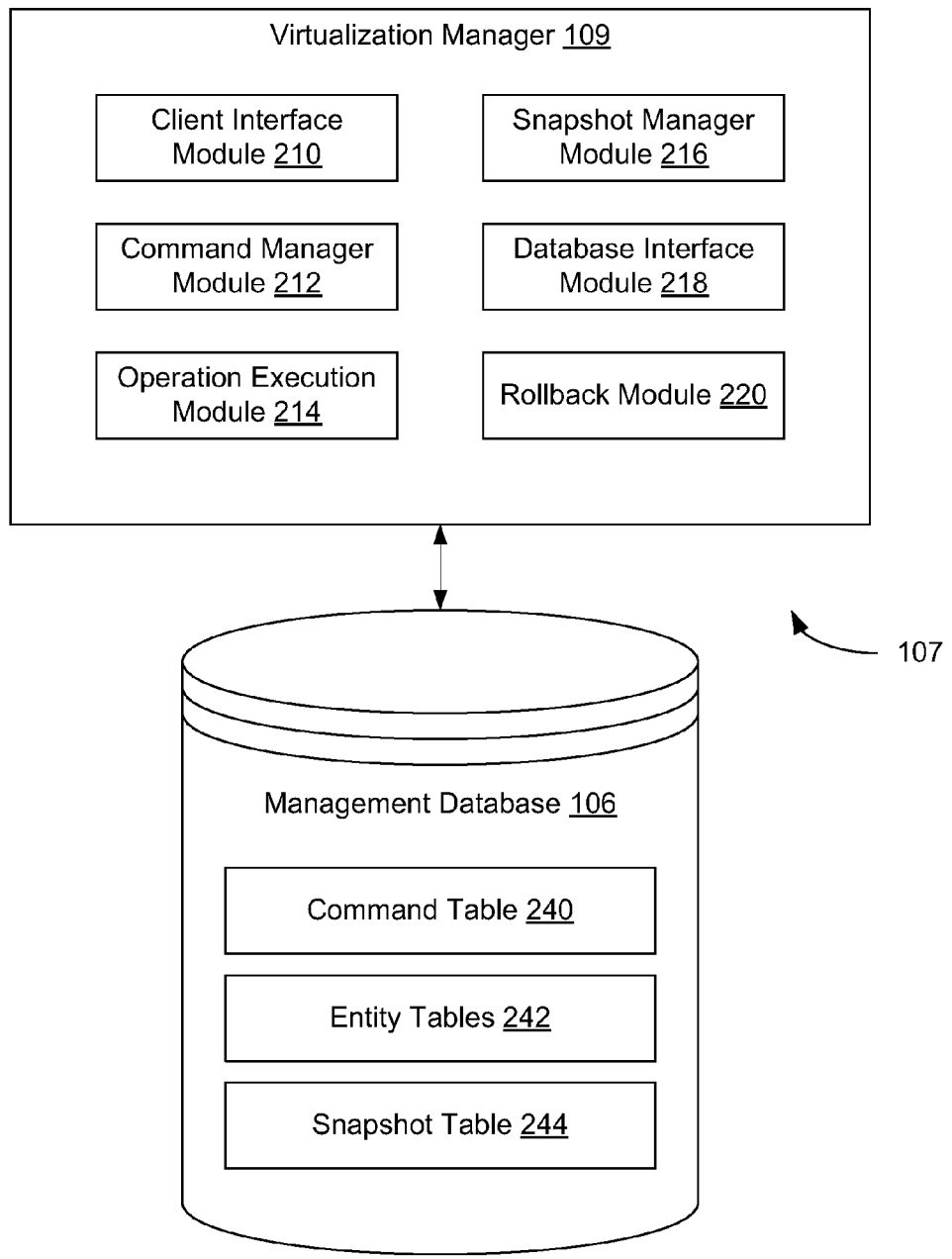
FIG. 2 is a block diagram illustrating a virtualization manager, according to an embodiment.

FIG. 2 is a block diagram illustrating a virtualization manager 109, according to an embodiment of the present invention. In one embodiments, virtualization manager 109 includes client interface module 210, command manager module 212, operation execution module 214, snapshot manager module 216, database interface module 218, and rollback module 220. This arrangement of modules may be a logical separation, and in other embodiments, these modules or other components can be combined together or separated in further components, according to a particular implementation. In one embodiment, management database 106 is connected to virtualization manager 109 and includes command table 240, entity tables 242 and snapshot table 244. In one embodiment, host controller 107 may include virtualization manager 109 and storage device 105 storing management database 106. In another embodiment, storage device 105 may be external to host controller 107 and may be connected to host controller 107 over a network or other connection. In other embodiments, host controller 107 may include different and/or additional components, which are not shown in order to simplify the description. Storage device 105 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, client interface module 210 manages communications between virtualization manager 109 and networked client devices 101. For example, client interface module 210 may receive a request from a client device 101 requesting the execution of a command in the virtualization system. The command may be issued by a user or application (e.g., through one of clients 101) to perform some action. For example, the command may be a request to start a new virtual machine 131, stop a virtual machine 131, create a virtual disk 133, or some other request. In some embodiments, client interface module 210 may provide an acknowledgment of receipt of the command request to the client device 101.

In one embodiment, upon receiving an indication of the command from client interface module 210, command manager module 212 may identify a series of transactions associated with the command. Each transaction may include one or more operations designed to carry out the action specified by the command. In one embodiment, command manager module 212 publishes an application programming interface (API) that breaks up the operations associated with a command into shorter separate transactions. Each transaction may include number of the operations included in the command that logically fit together and may be executed as a separate unit. In one embodiment, the transactions associated with a command are stored in command table 240. In another embodiment, command table 240 may be combined with snapshot table 244 as part of a single data structure. Command manager module 212 may consult command table 240, or the shared data structure with snapshot table 244 to identify the transactions associated with the command. In one embodiment, the transactions may be identified by a universal unique identifier (UUID) associated with the command.

In one embodiment, upon identifying the transactions corresponding to the requested command, operation execution module 214 executes the operations from the transactions. For example, if the command is a request to add a new virtual disk to a virtual machine, the transactions may include locking the target virtual machine so that no other operations may be performed, adding a new virtual disk to the virtual machine, pre-allocating the virtual disk, and unlocking the virtual machine. Operation execution module 214 may execute the specific operations in order to complete each of these transactions.

In one embodiment, upon executing a transaction associated with the command, snapshot manager module 216 may create a snapshot in snapshot table 244 of database 106. The snapshot may include information about the transaction executed by operation execution module 214. For example, the snapshot may include an indication of the command with which it is associated, an indication of the entity on which an action is performed, an indication of what action was performed, an indication of a change in state of the entity as a result of the action, and/or other information. This information in the snapshots may be maintained in snapshot table 244 until all of the transactions associated with the command have been successfully completed. In the event of a crash, failure or other error in one of the transactions, the information in the snapshots may be used to roll back the virtual machine system to the state that existed before the command was initiated. Depending on the type of entity-related database operation, the snapshot may be created before or after the transaction is executed. For example, in the case of adding a new entity, such as a virtual disk, the entity may first be added and the snapshot be created subsequently, to indicate the addition. In another case, however, such as the update to the state of an entity (e.g., locking a virtual machine), the snapshot may be created first (to reflect the prior state of the entity), and then the update is performed. In some cases, a second snapshot may created after the transaction is executed in order to reflect the updated state of the entity.

In one embodiment, database interface module 218 maintains the state of each entity in the system in entity tables 242. Once each transaction is completed, database interface module 218 commits the state of the affected entities to an entity table 242 of the management database 106. For example, if a virtual machine is initially unlocked, and then subsequently locked during execution of a transaction, database interface module 218 may overwrite the state of the virtual machine in the entity table as "locked." In the event of a crash, failure or other error in one of the transactions, there may be no way to determine from the entity table 242 itself what the previous state of that virtual machine was. Since the snapshot table 244 contains the initial state of any affected entities, the information in the snapshots may be used to roll back the virtual machine system to the state that existed before the command was initiated, thereby compensating for the changes after the transactions have been committed.

In one embodiment, rollback module 220 may compensate for the changes by reversing the operations performed as part of each transaction. Rollback module 220 may perform these roll back operations upon detecting a crash, failure or other error in one of the transactions or operations associated with a command. In one embodiment, the snapshot includes an insertion order indicating the order in which the transactions were executed. Rollback module 220 may undo each transaction in the reverse order in which they were performed. The end result may be returning the virtual machine system, and each of the entities therein, to the state that existed before the command was initiated.

Figure 3:
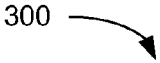
FIG. 3 is a block diagram illustrating a business entity snapshot, according to an embodiment.

FIG. 3 is a block diagram illustrating a business entity snapshot 300, according to an embodiment. The snapshot 300 may maintain information about the state of an entity that is affected by a transaction. In one embodiment, the snapshot 300 includes a number of fields, each including a specific piece of information that may be used to compensate for changes to database 106, after a transaction has been committed. Snapshot 300 may be one example of a snapshot created by snapshot manager module 216 and stored in snapshot table 244.

In one embodiment, snapshot 300 includes command ID field 310. The value stored in command ID field 310 may include a UUID indicating the command with which the transaction and snapshot 300 are associated. In other embodiments, command ID field 310 may include any other non-null value that uniquely identifies the associated command. Command type field 320 may include a description or value representing the type of command. For example, the value may indicate that the command includes adding a disk to a virtual machine, or other appropriate description.

Entity ID field 330 may include a value identifying an entity that is affected by the transaction. For example, if the state of a virtual machine is being changed, entity ID field 330 may include a value identifying the particular virtual machine. Each virtual machine 101 in system 100 may have an identifier. It is that identifier that may be stored in entity ID field 330. Entity type field 340 may include a value identifying the type of entity identified in entity ID field 330. For example, entity type field 340 may include the phrase "virtual machine" or may have a numerical value representing a virtual machine, or whatever entity type is appropriate. Entity snapshot field 350 may include a description of the operations performed during the transaction. For example, entity snapshot field 350 may have a string such as "lock virtual machine." In addition, entity snapshot field 350 may also include an indication of the state of the entity prior to the transaction. Thus, if the previous state of the virtual machine was unlocked, entity snapshot field may have a value or description indicating "unlocked."

Snapshot type field 360 may include a description or value representing the type of operation performed during the transaction. Some examples may include "new" for adding a new entity, "remove" for removing an entity from the system, or "update" for changing the state of an already existing entity (e.g., locking or unlocking a virtual machine). Insertion order field 370 may include a value representing the order in which snapshots were created. For example, the value in insertion order field 370 may be an integer that is incremented each time a new snapshot is created. Started at field 380 may include a timestamp indicating a time at which the snapshot was created. In other embodiments, snapshot 300 may include some combination of these and/or other fields.

Figure 4:
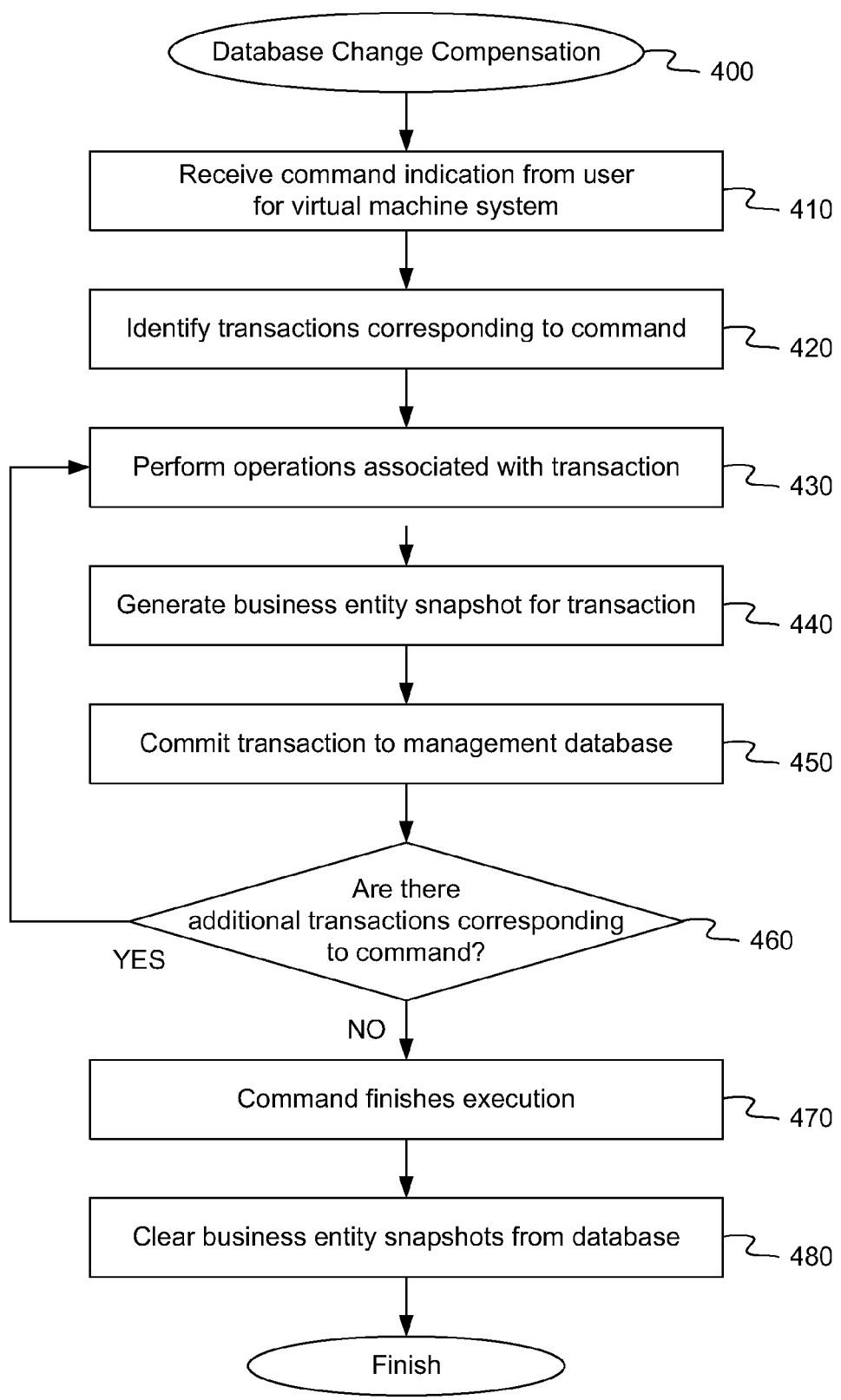
FIG. 4 is a flow diagram illustrating a method for database change compensation, according to an embodiment.

FIG. 4 is a flow diagram illustrating a method 400 for database change compensation according to an embodiment of the present invention. The method 400 may be performed by processing logic that may comprise hardware (e.g., circuitry, dedicated logic, programmable logic, microcode, etc.), software (e.g., instructions run on a processing device to perform hardware simulation), or a combination thereof. The processing logic may generate a business entity snapshot for each transaction associated with a command, which may be used to roll back the virtual machine system to a previous state in the event of a crash or failure. In one embodiment, the method 400 is performed by virtualization manager 109, as shown in FIGS. 1 and 2.

Referring to FIG. 4, at block 410, method 400 receives a command indication from a user for a virtual machine system. In one embodiment, client interface module 210 receives a request from a client device 101 requesting the execution of a command in the virtualization system. The command may be issued by a user or application (e.g., through one of clients 101) to perform some action. For example, the command may be a request to start a new virtual machine 131, stop a virtual machine 131, create a virtual disk 133, or some other request.

At block 420, method 400 identifies one or more transactions corresponding to the received command. In one embodiment, upon receiving an indication of the command from client interface module 210, command manager module 212 may identify a series of transactions associated with the command. Each transaction may include one or more operations designed to carry out the action specified by the command. Each transaction may include a number of the operations included in the command that logically fit together and may be executed as a separate unit. In one embodiment, the transactions associated with a command are stored in command table 240. Command manager module 212 may consult command table 240 to identify the transactions associated with the command. In one embodiment, the transactions may be identified by a universal unique identifier (UUID) associated with the command.

At block 430, method 400 performs operations associated with the transaction. In one embodiment, upon identifying the transactions corresponding to the requested command, operation execution module 214 executes the operations from the transactions. For example, if the command is a request to add a new virtual disk to a virtual machine, the transactions may include locking the target virtual machine so that no other operations may be performed, adding a new virtual disk to the virtual machine, pre-allocating the virtual disk, and unlocking the virtual machine. Operation execution module 214 may execute the specific operations in order to complete each of these transactions.

At block 440, method 400 generates a business entity snapshot for the executed transaction. In one embodiment, upon executing a transaction associated with the command, snapshot manager module 216 may create a snapshot in snapshot table 244 of database 106. The snapshot may include information about the transaction executed by operation execution module 214. Depending on the type of transaction, the snapshot may be created before or after the transaction is executed. For example, in the case of adding a new entity, such as a virtual disk, the entity may first be added and the snapshot be created subsequently to indicate the addition. In another case, however, such as the update to the state of an entity (e.g., locking a virtual machine), the snapshot may be created first (to reflect the prior state of the entity), and then the update is performed. In some cases, a second snapshot may created after the transaction is executed in order to reflect the updated state of the entity.

At block 450, method 400 commits the transaction to the management database. In one embodiment, database interface module 218 maintains the state of each entity in the system in entity tables 242. Once each transaction is completed, database interface module 218 commits the state of the affected entities to an entity table 242 of the management database 106. For example, if a virtual machine is initially unlocked, and then subsequently locked during execution of a transaction, database interface module 218 may overwrite the state of the virtual machine in the entity table as "locked."

At block 460, method 400 determines if there are additional transactions corresponding to the requested command. If there are additional transactions, method 400 may repeat the actions at blocks 430, 440 and 450 for each remaining transaction. If there are no additional transactions to execute, method 400 may continue to block 470.

At block 470, once all transactions associated with the command have been performed, the command finishes execution. At block 480, method 400 clears the business entity snapshots from the database. In one embodiment, snapshot manager module 216 reads snapshot table 244 and identifies all snapshots associated with the command (e.g., by scanning the command ID field 310 of each snapshot). Snapshot manager module 216 can delete the snapshots to make room for new snapshots, as the old snapshots are no longer needed. In addition, this may prevent the system from improperly trying to roll back based on the previous set of snapshots.

Figure 5:
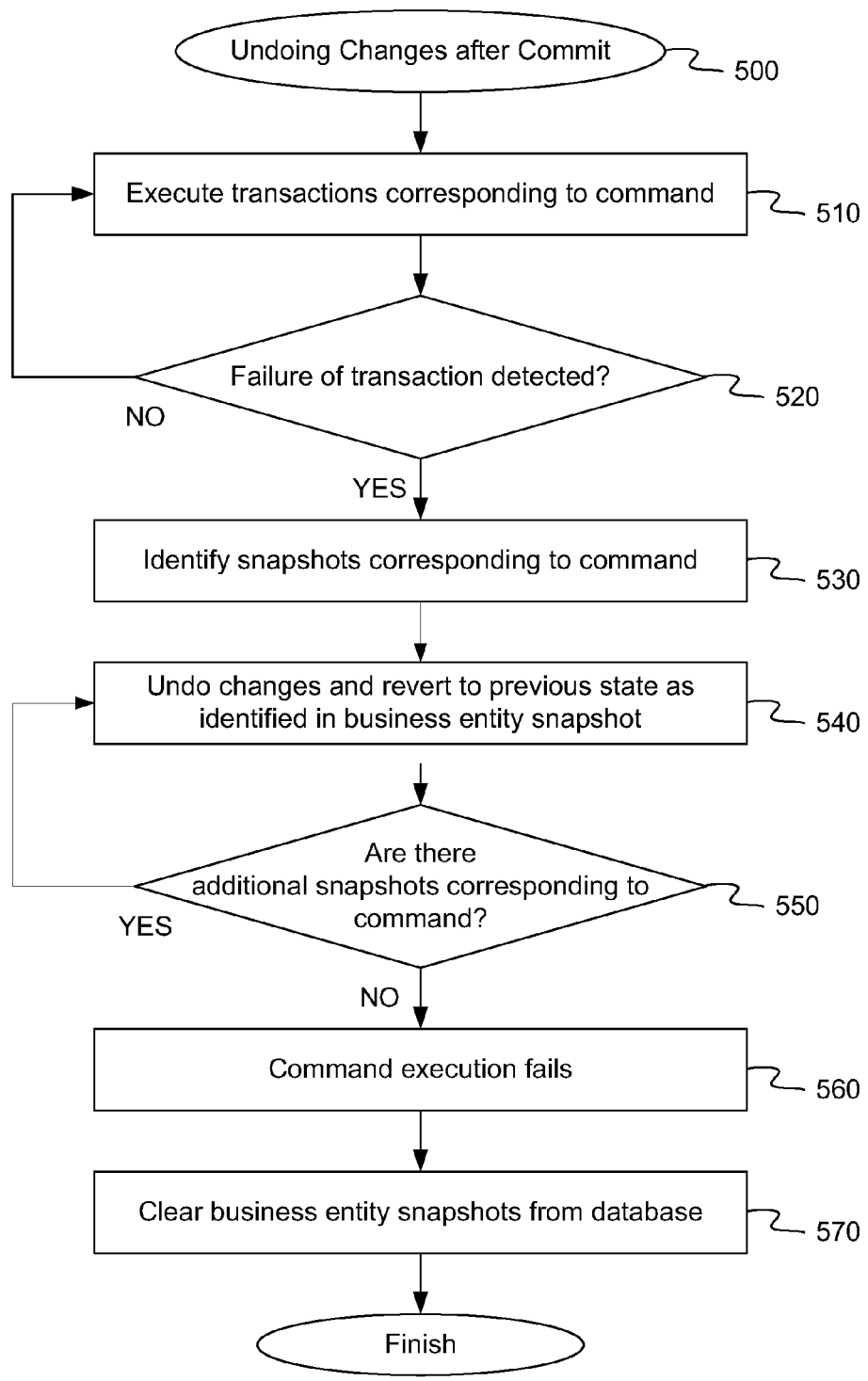
FIG. 5 is a flow diagram illustrating a method for undoing changes after a transaction commit, according to an embodiment.

FIG. 5 is a flow diagram illustrating a method for undoing changes as a result of a failure at command execution after a transaction commit, according to an embodiment of the present invention. The method 500 may be performed by processing logic that comprises hardware (e.g., circuitry, dedicated logic, programmable logic, microcode, etc.), software (e.g., instructions run on a processing device to perform hardware simulation), or a combination thereof. The processing logic may roll back the changes using the information in the business entity snapshots to return the system to its previous state in the event of a crash or failure. In one embodiment, method 500 may be performed by virtualization manager 109, as shown in FIGS. 1 and 2.

Referring to FIG. 5, at block 510, method 500 executes transactions corresponding to a command. As described above with respect to FIG. 4, operation execution module 214 executes the operations from the transactions. As each is completed, snapshot manager module 216 may generate a corresponding business entity snapshot in snapshot table 244 and database interface module 218 may commit the transaction to database 106 in entity tables 242.

At block 520, method 500 determines if a failure of any transaction has been detected. If no failure is detected, method 500 returns to block 510 and continues executing transactions for the command. If, however, method 500 detects a crash, error or other failure at block 520, method 500 continues to block 530.

At block 530, method 500 identifies snapshots in snapshot table 244 corresponding to the current command. In one embodiment, snapshot manager 216 reads snapshot table 244 and identifies all snapshots associated with the command (e.g., by scanning the command ID field 310 of each snapshot).

At block 540, method 500 undoes changes of a particular transaction and reverts the affected entities back to their previous state as identified in the business entity snapshot (e.g., snapshot 300). In one embodiment, rollback module 220 may compensate for the changes by reversing the operations performed as part of each transaction. For example, if the transaction added a new entity, rollback module 202 may remove that entity. If the transaction removed an entity, rollback module 202 may restore that entity. If the transaction changed the state of an entity (e.g., locked a virtual machine), rollback module 202 may revert the entity back to the previous state (e.g., unlock the virtual machine). In one embodiment, the snapshot includes an insertion order field 370 with a value indicating the order in which the transactions were executed. Rollback module 220 may undo each transaction in the reverse order in which they were performed. The end result may be returning the virtual machine system, and each of the entities therein, to the state that existed before the command was initiated. In one embodiment, rollback module 220 provides instructions to database interface module 218 causing database interface module 218 to update the information in entity tables 242 to reflect the undoing of the transaction. Thus, the entity tables 242 reflect the previous state of the system from before the command was initiated, as well.

At block 550, method 500 determines if there are additional snapshots corresponding to the command. If there are additional snapshots corresponding to the command, method 500 returns to block 540 and undoes the changes associated with the transactions for each remaining snapshot. If there are no additional snapshots, method 500 continues to block 560.

At block 560, the command execution fails. Since one of the transactions suffered a crash, failure or other error, the command cannot be completed. The transactions associated with the command are atomic, such that if they cannot all be completed successfully, the remaining transactions must be undone so that the system is returned to the state before any of the transactions associated with the command were performed. At block 570, method 500 clears the business entity snapshots from the database. In one embodiment, snapshot manager module 216 reads snapshot table 244 and identifies all snapshots associated with the command (e.g., by scanning the command ID field 310 of each snapshot). Snapshot manager module 216 can delete the snapshots to make room for new snapshots, as the old snapshots are no longer needed.

Figure 6:
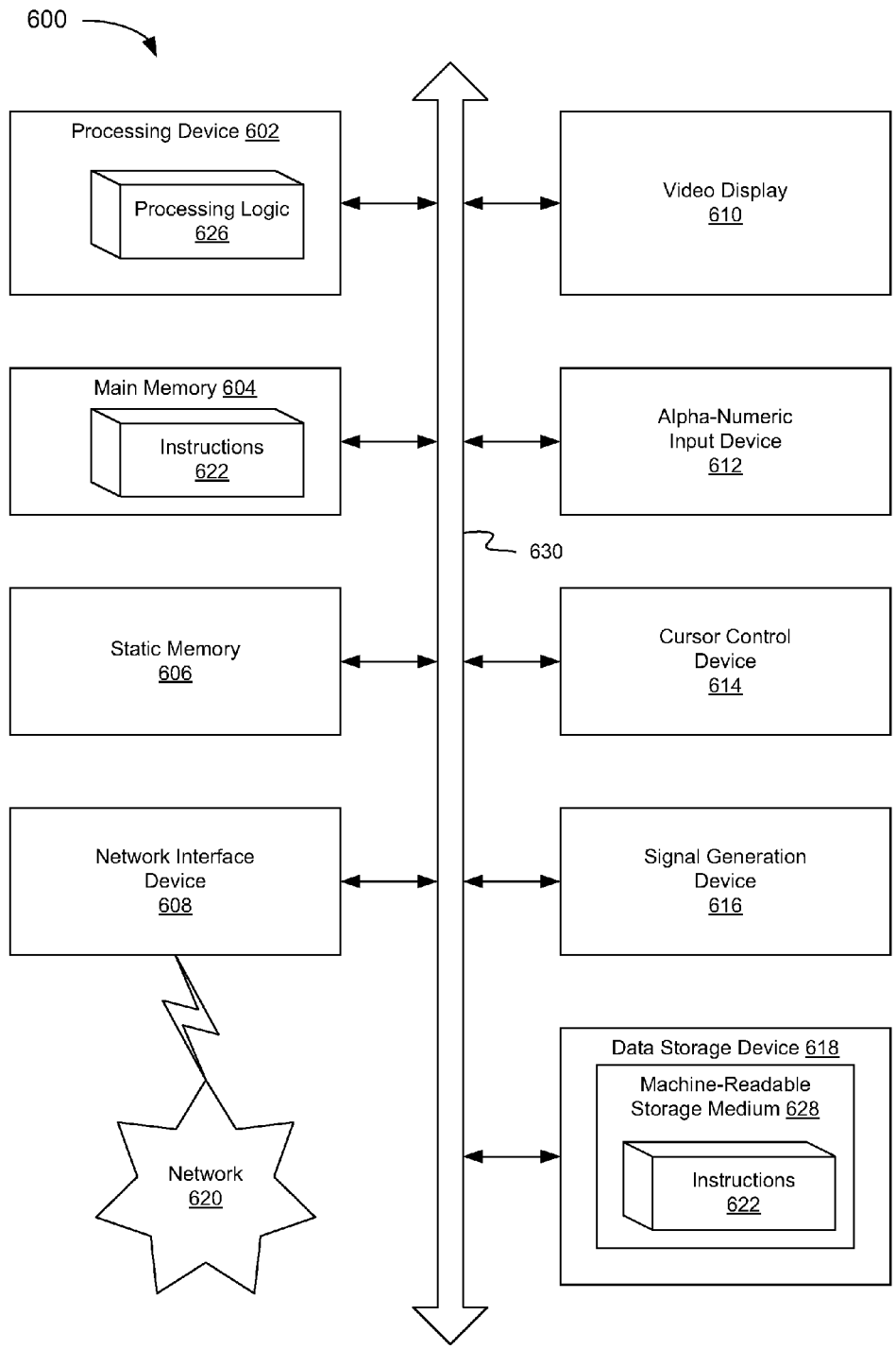
FIG. 6 is a block diagram illustrating a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as client 101, host server 103 or host controller 107 running virtualization manager 109.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions for database change compensation after a transaction commit, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method comprising:
   receiving a request to perform a command in a virtual machine system;
   executing, by a processing device, a plurality of transactions associated with the command, each of the plurality of transactions comprising one or more operations executed on entities in the virtual machine system;
   committing changes made to the entities in the virtual machine system as a result of the plurality of transactions to a management database for the virtual machine system; and
   generating a business entity snapshot corresponding to a first transaction of the plurality of transactions, the business entity snapshot comprising a data structure pertaining to an entity in the virtual machine system affected by the first transaction, the data structure having one or more entries, each corresponding to a different parameter representing state information for the entity at a point in time before the plurality of transactions were executed.

2. The method of claim 1, further comprising:
   detecting an error in one of the plurality of transactions; and
   reversing the operations associated with the first transaction using the state information in the business entity snapshot to restore the entities in the virtual machine system to a state that existed before the first transaction was executed.

3. The method of claim 1, wherein the plurality of transactions associated with the command is atomic, such that if all of the plurality of transactions are not completed successfully, operations corresponding to the remaining transactions are reversed.

4. The method of claim 1, wherein committing changes made to the entities in the virtual machine system to the management database comprises updating an entry in an entity table corresponding to each entity to reflect a change in state of the entity.

5. The method of claim 1, wherein the business entity snapshot comprises a plurality of fields including at least one of a command identifier field, a command type field, an entity identifier field, an entity type field, an entity snapshot field, a snapshot type field, an insertion order field or a started at field.

6. The method of claim 1, further comprising:
   generating a separate business entity snapshot for each of the plurality of transactions associated with the command.

7. The method of claim 6, further comprising:
   in response to all of the plurality of transactions associated with the command being successfully executed, deleting the business entity snapshots corresponding to the plurality of transactions.

8. A system comprising:
   a processing device; and
   a memory operatively coupled to the processing device; and
   a virtualization manager, executable by the processing device from the memory, to:
     receive a request to perform a command in a virtual machine system;
     execute a plurality of transactions associated with the command, each of the plurality of transactions comprising one or more operations executed on entities in the virtual machine system;
     commit changes made to the entities in the virtual machine system as a result of the plurality of transactions to a management database for the virtual machine system; and
     generate a business entity snapshot corresponding to a first transaction of the plurality of transactions, the business entity snapshot comprising a data structure pertaining to an entity in the virtual machine system affected by the first transaction, the data structure having one or more entries, each corresponding to a different parameter representing state information for the entity at a point in time before the plurality of transactions were executed.

9. The system of claim 8, the virtualization manager further to:
   detect an error in one of the plurality of transactions; and
   reverse the operations associated with the first transaction using the state information in the business entity snapshot to restore the entities in the virtual machine system to a state that existed before the first transaction was executed.

10. The system of claim 8, wherein the plurality of transactions associated with the command is atomic, such that if all of the plurality of transactions are not completed successfully, operations corresponding to the remaining transactions are reversed.

11. The system of claim 8, wherein to commit changes made to the entities in the virtual machine system to the management database, the virtualization manager to update an entry in an entity table corresponding to each entity to reflect a change in state of the entity.

12. The system of claim 8, wherein the business entity snapshot comprises a plurality of fields including at least one of a command identifier field, a command type field, an entity identifier field, an entity type field, an entity snapshot field, a snapshot type field, an insertion order field or a started at field.

13. The system of claim 8, the virtualization manager further to:
   generating a separate business entity snapshot for each of the plurality of transactions associated with the command.

14. The system of claim 13, the virtualization manager further to:

in response to all of the plurality of transactions associated with the command being successfully executed, deleting the business entity snapshots corresponding to the plurality of transactions.

15. A non-transitory machine-readable storage medium storing instructions which, when executed, cause a processing device to:

receive a request to perform a command in a virtual machine system;

execute, by the processing device, a plurality of transactions associated with the command, each of the plurality of transactions comprising one or more operations executed on entities in the virtual machine system;

commit changes made to the entities in the virtual machine system as a result of the plurality of transactions to a management database for the virtual machine system; and generate a business entity snapshot corresponding to a first transaction of the plurality of transactions, the business entity snapshot comprising a data structure pertaining to an entity in the virtual machine system affected by the first transaction, the data structure having one or more entries, each corresponding to a different parameter representing state information for the entity at a point in time before the plurality of transactions were executed.

16. The non-transitory machine-readable storage medium of claim 15, wherein the instructions further cause the processing device to:

detect an error in one of the plurality of transactions; and reverse the operations associated with the first transaction using the state information in the business entity snapshot to restore the entities in the virtual machine system to a state that existed before the first transaction was executed.

17. The non-transitory machine-readable storage medium of claim 15, wherein the plurality of transactions associated with the command is atomic, such that if all of the plurality of transactions are not completed successfully, operations corresponding to the remaining transactions are reversed.

18. The non-transitory machine-readable storage medium of claim 15, wherein to commit changes made to the entities in the virtual machine system to the management database, the processing device to update an entry in an entity table corresponding to each entity to reflect a change in state of the entity.

19. The non-transitory machine-readable storage medium of claim 15, wherein the business entity snapshot comprises a plurality of fields including at least one of a command identifier field, a command type field, an entity identifier field, an entity type field, an entity snapshot field, a snapshot type field, an insertion order field or a started at field.

20. The non-transitory machine-readable storage medium of claim 15, wherein the instructions further cause the processing device to:

generate a separate business entity snapshot for each of the plurality of transactions associated with the command.

21. The non-transitory machine-readable storage medium of claim 20, wherein the instructions further cause the processing device to:

in response to all of the plurality of transactions associated with the command being successfully executed, delete the business entity snapshots corresponding to the plurality of transactions.

* * * * *